(12) United States Patent
Arumugham et al.

(10) Patent No.: US 9,963,136 B2
(45) Date of Patent: May 8, 2018

(54) PNEUMATIC CONTROL VALVE

(71) Applicant: Wabco India Limited, Chennai (IN)

(72) Inventors: Ganesamoorthy Arumugham, Chennai (IN); Vinoth Kumar Rangaraj, Chennai (IN); Narayanan Sreenivasan, Chennai (IN); Selvamani Sundaramahalingam, Chennai (IN)

(73) Assignee: WABCO INDIA LIMITED, Chennai (IN)

( * ) Notice: Subject to any disclaimer, the term of this patent is extended or adjusted under 35 U.S.C. 154(b) by 14 days.

(21) Appl. No.: 15/106,402

(22) PCT Filed: Oct. 20, 2014

(86) PCT No.: PCT/IB2014/002175
§ 371 (c)(1),
(2) Date: Jun. 20, 2016

(87) PCT Pub. No.: WO2015/092500
PCT Pub. Date: Jun. 25, 2015

(65) Prior Publication Data
US 2016/0339891 A1    Nov. 24, 2016

(30) Foreign Application Priority Data

Dec. 20, 2013  (IN) ............................ 5978/CHE/2013

(51) Int. Cl.
*B60T 15/04*  (2006.01)
(52) U.S. Cl.
CPC ................................. *B60T 15/046* (2013.01)
(58) Field of Classification Search
CPC .................................................... B60T 15/046
See application file for complete search history.

(56) References Cited

U.S. PATENT DOCUMENTS 3,138,411 A * 6/1964 Bueler .................. B60T 15/046
                                                  303/52
3,580,646 A * 5/1971 Ternent ................. B60T 15/046
                                                  137/627.5
(Continued)

FOREIGN PATENT DOCUMENTS

DE       33 43 172       5/1992
DE       196 11 428      9/1996
GB       2 181 803       4/1987

OTHER PUBLICATIONS

International Search Report, dated May 19, 2015 (2 pages).
Written Opinion of the International Searching Authority, dated May 19, 2015 (6 pages).

*Primary Examiner* — Eric Keasel
(74) *Attorney, Agent, or Firm* — Jacobson Holman, PLLC.

(57) ABSTRACT

Pneumatic control valve of a vehicle air brake system, having at least one first valve system which is arranged in a housing upper part with a first valve piston which can be actuated via an elastomer spring element, and having a second valve system which is arranged in a housing lower part with a coaxially arranged second valve piston which can be actuated by the first valve system and with a second annular plate valve. The elastomer spring element and the first valve piston are configured in one piece as a composite component. In the region of a radial sealing lip of the spring element, the material of the elastomer spring element engages radially and axially in a positively locking manner around a radially outer section of the first valve piston.

8 Claims, 2 Drawing Sheets

(56) References Cited

U.S. PATENT DOCUMENTS

| | | | | |
|---|---|---|---|---|
| 3,712,685 | A | * | 1/1973 | Hoffman ............... B60T 15/046 137/596.15 |
| 3,934,942 | A | * | 1/1976 | Klimek ................ B60T 15/046 303/40 |
| 3,992,065 | A | * | 11/1976 | Pekrul .................. B60T 15/046 137/627.5 |
| 4,025,123 | A | * | 5/1977 | Oberthuer ................ B60T 8/26 303/9.63 |
| 4,116,492 | A | * | 9/1978 | Reinecke ............. B60T 15/046 303/22.4 |
| 4,227,746 | A | * | 10/1980 | Schopper ................ B60T 11/34 137/87.01 |
| 4,679,594 | A | * | 7/1987 | Fogg .................... B60T 15/046 137/627.5 |
| 4,741,579 | A | * | 5/1988 | Angelillo ............. B60T 15/046 303/52 |
| 4,822,110 | A | * | 4/1989 | Angelillo ............. B60T 15/046 303/52 |
| 5,562,186 | A | | 10/1996 | Osenbaugh |

* cited by examiner

PNEUMATIC CONTROL VALVE

The invention relates to a pneumatic control valve, in particular a dual-circuit brake transducer in a compressed-air brake system of a vehicle for correcting a brake pressure which corresponds to a desired braking action, having at least one first valve system which is arranged in a housing upper part with a first valve piston which can be actuated via an elastomer spring element manually or by means of an actuator and with a first annular plate valve which interacts therewith, and having a second valve system which is arranged in a housing lower part with a coaxially arranged second valve piston which can be actuated pneumatically and/or mechanically by the first valve system and with a second annular plate valve which interacts therewith.

BACKGROUND OF THE INVENTION

A control valve of this type corresponds in terms of its construction to the known control valves of Wabco Series No. 461315xx which is shown in FIG. 1 in a longitudinal section. In the case of this control valve, the first valve piston is guided in a housing upper part and is sealed by means of an O-ring seal. A plunger piston which can be actuated manually or with the aid of an actuator acts via a pressure plate and an elastomer spring element on the first valve piston which for its part interacts in a known way with a first valve system, to which it belongs. Since, in the case of an actuation of the control valve, a push rod (not shown) acts on the plunger piston with an angular deviation which changes upon actuation with regard to the longitudinal axis of the control valve, lateral forces and tilting moments are transmitted via the pressure plate on the valve piston. In order to absorb these loads, the first valve piston is guided in the housing upper part by way of a cylindrical guide sleeve which has a comparatively large axial length, as a result of which the installation space which is required for it in the housing upper part is rather long. Furthermore, tilting moments and transverse forces which act on the plunger piston are transmitted via the pressure plate directly to the cylindrical guide of the valve piston and, under unfavourable operating conditions, can lead to an undesired reduction of the sealing action of the O-ring seal on account of the increased wear which is brought about by the transverse forces and the tilting moments. For this reason, this known control valve which has proven itself satisfactorily in normal operation needs to be improved.

Against this background, the invention is based on the object of improving a pneumatic control valve of the type mentioned at the outset, in such a way that the sealing action of the valve piston with respect to the housing upper part is impaired less by tilting moments and transverse forces which occur upon actuation of the control valve. Moreover, the novel control valve is to be comparatively simple to assemble and to have a comparatively low weight.

BRIEF SUMMARY OF THE INVENTION

The object is achieved by the disclosed novel control valve and a vehicle which is equipped with the novel control valve and to the use of the novel control valve in a compressed-air brake system of a vehicle.

Accordingly, the invention proceeds from a pneumatic control valve, in particular a dual-circuit brake transducer in a compressed-air brake system of a vehicle for correcting a brake pressure which corresponds to a desired braking action, having at least one first valve system which is arranged in a housing upper part with a first valve piston which can be actuated via an elastomer spring element manually or by means of an actuator and with a first annular plate valve which interacts therewith, and having a second valve system which is arranged in a housing lower part with a coaxially arranged second valve piston which can be actuated pneumatically and/or mechanically by the first valve system and with a second annular plate valve which interacts therewith.

In order to achieve the addressed object, it is provided in this control valve that, in the case of the first valve system, the elastomer spring element and the first valve piston are configured in one piece as a composite component, and that, in the region of a radial sealing lip of the elastomer spring element, the material of the elastomer spring element engages radially and axially in a positively locking manner around a radially outer section of the first valve piston.

The depicted single-piece design of elastomer spring element and first valve piston makes a very short overall length of the first valve piston possible. On account of the small axial extent of the first valve piston, tilting moments and transverse forces which are caused by the actuation of the plunger piston have lesser effects on the position of the valve piston in the housing upper part and on the effectiveness of the sealing lip which engages over and around the valve piston in a positively locking manner, with the result that a radial play which reduces the wear is possible between the valve piston and the housing upper part.

For the reliable positively locking connection between the first valve piston and the elastomer spring element, it is preferably provided that, on its side which is remote from the second valve piston, the first valve piston has an undercut annular groove, into which a complementarily shaped, annular protrusion on the elastomer spring element engages in a positively locking manner.

In order firstly to meter the force which is applied to the first valve piston via the plunger piston and the pressure plate and secondly to achieve an optimum sealing action of the sealing lip, that region of the elastomer spring element which brings about a resilient support of the first valve piston on the pressure plate has a greater Shore hardness than the sealing lip.

In order to utilize the elastomer properties of the elastomer spring element advantageously, it can be provided that the elastomer spring element is of frustoconical configuration outside its connecting region to the first valve piston, and that the elastomer spring element is supported in said frustoconical region with its smaller diameter region on the first valve piston and with its larger diameter region on the pressure plate.

It is provided according to another refinement that the first valve piston has, radially on the inside, a hollow-cylindrical projection, into which a section of the plunger piston protrudes in a positively locking manner, which section centres the first valve piston radially. Accordingly, an axial actuating force can be exerted on the first valve piston by means of the plunger piston via the pressure plate and the elastomer spring element and, moreover, the plunger piston ensures that the first valve piston is arranged in a radially centrally centred manner in the upper housing part of the control valve even during a valve actuation. This is very advantageous because this centering task cannot be fulfilled by the sealing lip which is arranged radially on the outside of the component part, consisting of the elastomer spring element and the first valve piston.

It can be provided, furthermore, that the hollow-cylindrical projection of the first valve piston has a central hole, through which a cylindrical projection of the plunger piston protrudes. The cylindrical projection of the plunger piston serves for the actual centering of the plunger piston, which will still be discussed in conjunction with an exemplary embodiment.

It can be provided according to a further refinement of the invention that the plunger piston is received fixedly in a central, stepped bore of the pressure plate, that the plunger piston is guided axially in the housing upper part by means of a radially outer hollow-cylindrical projection of the pressure plate, and that the elastomer spring element is supported axially and radially with its larger diameter region which is remote from the piston radially inside the hollow-cylindrical projection of the pressure plate on the said pressure plate. As a result of this construction, the plunger piston is also radially centred satisfactorily at its upper end. Moreover, an actuating force of the plunger piston can be forwarded very effectively to the first valve piston via the pressure plate and the elastomer spring element.

In order to achieve a fixed assembly between the elastomer spring element and the first valve piston and to simplify a corresponding production method, the elastomer spring element can be moulded integrally onto the valve piston in a mould which receives the valve piston, it being possible for those surface regions of the valve piston which come into contact with the elastomer spring element during moulding to be coated with an adhesion promoter.

With regard to the preferred embodiment of the elastomer spring element with a region with a greater Shore hardness which brings about the resilient support of the valve piston on the pressure plate and with a sealing lip with a smaller Shore hardness, the elastomer spring element can be moulded onto the valve piston by way of a two-component injection-moulding method.

Furthermore, the abovementioned object is achieved by a vehicle, for example by a commercial vehicle, which is characterized by a control valve of the type defined in the preceding text. Furthermore, the object is also achieved by the use of the control valve according to the invention in a compressed-air brake system of a vehicle.

BRIEF DESCRIPTION OF THE SEVERAL VIEWS OF THE DRAWINGS

In the following text, the invention will be explained further using an exemplary embodiment which is shown in the drawing. In the drawing.

DETAILED DESCRIPTION OF THE INVENTION

In the following text, the control valve 45 (shown in FIG. 1) according to the prior art will be described only with regard to features which are in accordance with the control valve according to the invention.

Figure 1:
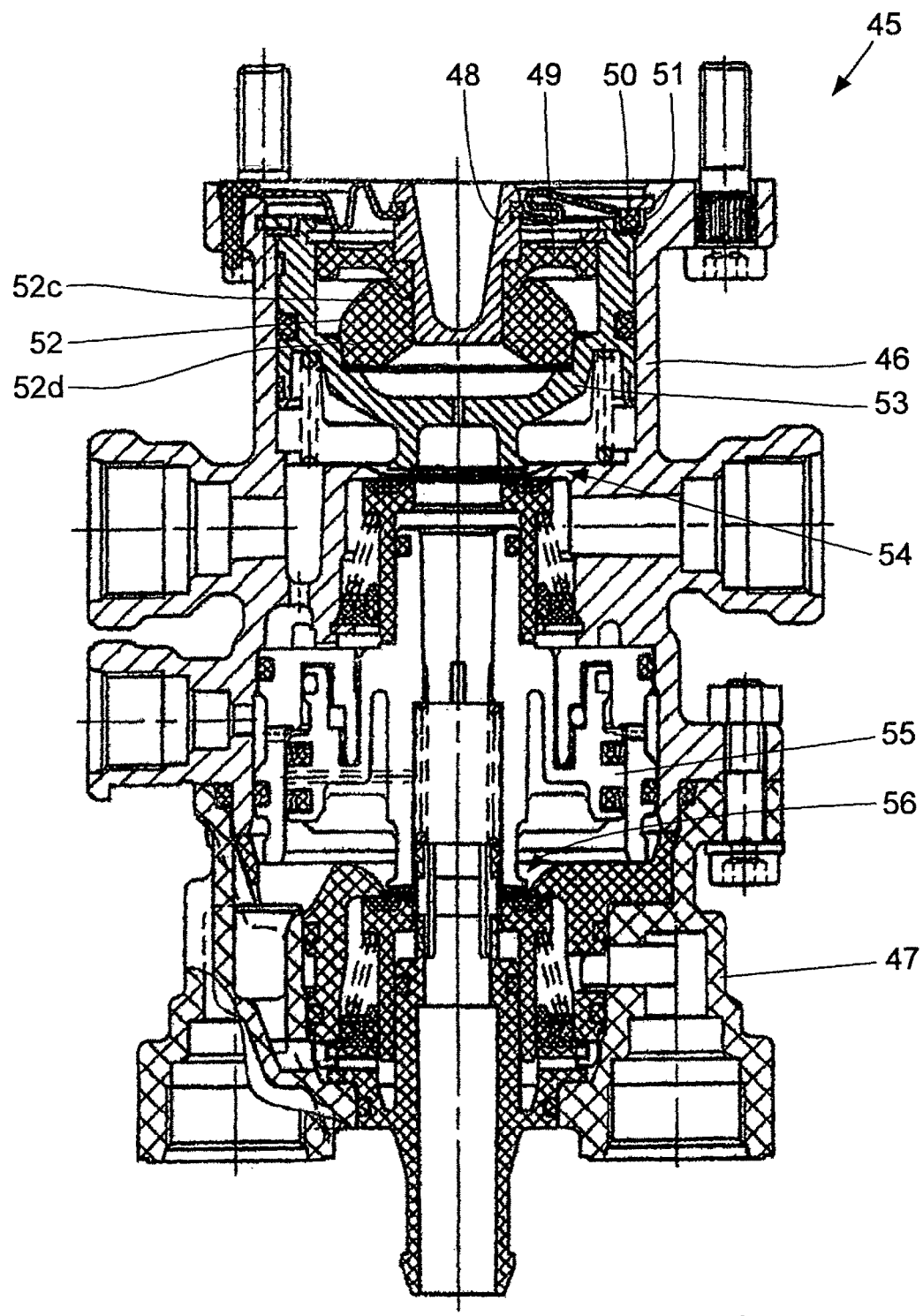
FIG. 1 shows a diagrammatic longitudinal section illustration of a control valve according to the prior art mentioned at the outset.

The control valve 45 according to FIG. 1 has a housing upper part 46 and a housing lower part 47 which are joined together in a sealed manner. A plunger piston 48 which can be actuated manually or by means of an actuator is arranged axially displaceably in the housing upper part 46, which plunger piston 48 acts via a pressure plate 49 and a frustoconical elastomer spring element 52 on a first valve piston 53. The said first valve piston 53 is guided with its cylindrical shell in a sealed manner on a cylindrical inner wall of the housing upper part 46 and is secured against sliding out by a securing ring 51 which is arranged in a groove 50 of the housing upper part 46. The first valve piston 53 interacts with a first annular plate valve 54. A second valve piston 55 is arranged displaceably in the housing upper part 46 coaxially with respect to the first valve piston 53 and interacts with a second annular plate valve 56. The elastomer spring element 52 bears with its small diameter region 52c against the pressure plate 49 and with its large diameter region 52d against the first valve piston 53.

Figure 2:
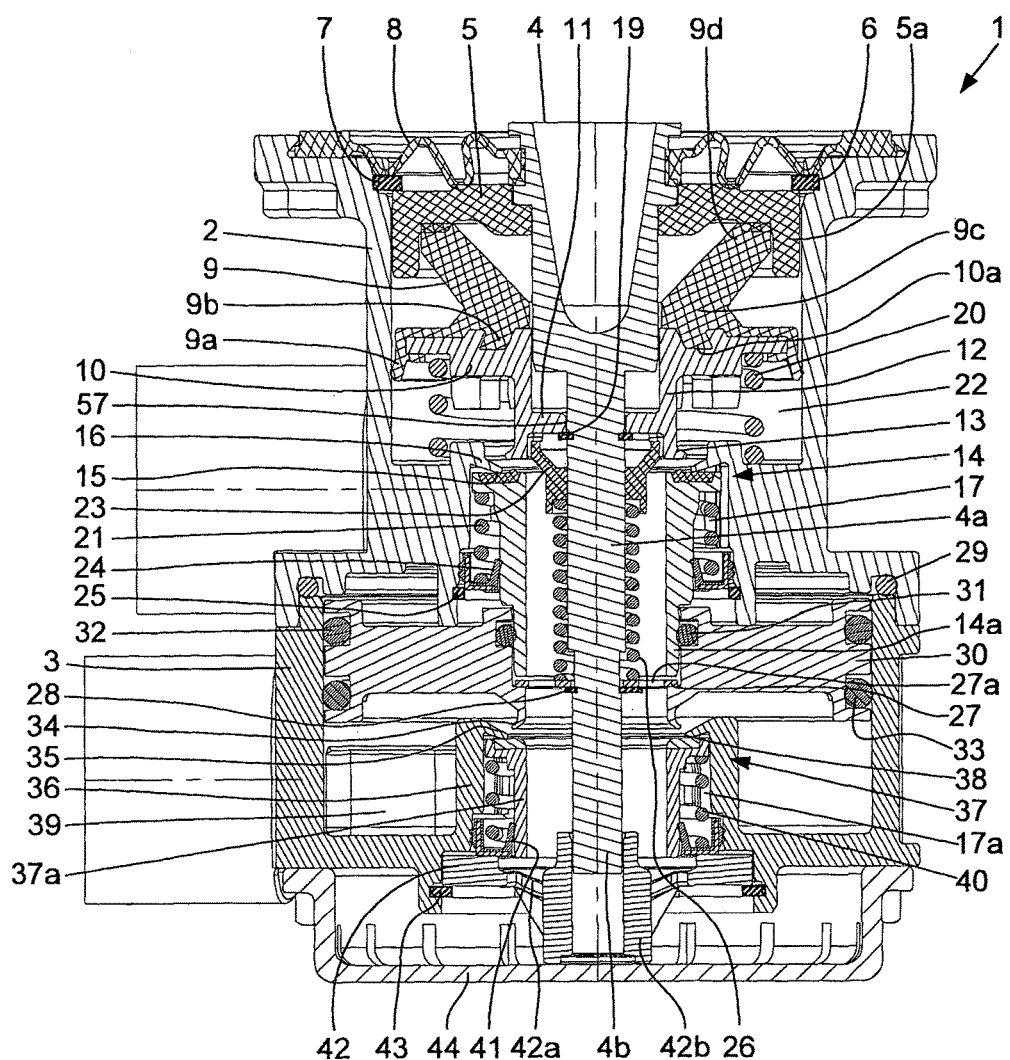
FIG. 2 shows a diagrammatic longitudinal section illustration of the control valve having the features of the invention.

The method of operation of the said known control valve 45 shown in FIG. 1 and that of a control valve 1 which is shown in FIG. 2 and is configured according to the invention are substantially consistent with the method of operation of the control valves which are shown and described in GB 2 181 803 A and in DE 33 43 172 02. This method of operation is not a constituent part of the present invention and is therefore also not described in detail, but its content in this regard is made the subject matter of the disclosure completely here.

The control valve 1 (according to FIG. 2) which is configured according to the invention has a housing consisting of a housing upper part 2 and a housing lower part 3 which are joined together in a sealed manner with a sealing ring 29 positioned in between. A plunger piston 4 penetrates a pressure plate 5 centrally and is guided axially displaceably in the housing upper part 2 via its radially outer hollow-cylindrical projection 5a, and is secured against falling out of the housing upper part 2 by a securing ring 7 which is arranged in a circumferential groove 6 of the housing upper part 2. The housing upper part 2 is sealed to the outside by means of a folding bellows 8.

An elastomer spring element 9 of frustoconical configuration is arranged between the pressure plate 5 and a first valve piston 10. The elastomer spring element 9 is supported with its larger diameter region 9d radially inside the cylindrical projection 5a of the pressure plate 5 on the said pressure plate 5 and with its smaller diameter region 9c on the first valve piston 10. The elastomer spring element 9 is moulded integrally on the first valve piston 10 outside its frustoconical region and engages around the material of the elastomer spring element 9 and engages over the first valve piston 10 there. In this connecting region, a radially outwardly directed sealing lip 9a is formed on the composite component consisting of elastomer spring element 9 and first valve piston 10. Furthermore, the first valve piston 10 is provided with an undercut annular groove 10a on its side which faces the pressure plate 5, into which annular groove 10a an annular axial protrusion 9b of the elastomer spring element 9 engages.

In order to form the said composite component, the elastomer spring element 9 is preferably moulded onto the valve piston 10 in a mould which receives the first valve piston 10. In order to ensure secure adhesion of the elastomer spring element 9 on the first valve piston 10, those surface regions of the first valve piston 10 which come into contact with the elastomer spring element 9 during moulding are coated with an adhesion promoter.

The frustoconical region of the elastomer spring element 9 is preferably composed of an elastomer with a greater Shore hardness than that region, on which the sealing lip 9a is formed, it being possible for the elastomer spring element 9 to be moulded onto the first valve piston 10 by way of a two-component injection-moulding method.

The first valve piston 10 has a hollow-cylindrical projection 12 which ends in an annular sealing seat 13. A first axial cylindrical projection 4a of the plunger piston 4 is guided through a hole 57 in a radial, head-shaped protrusion 11 on the first valve piston 10. A securing ring 19 which is arranged in a groove of the first cylindrical projection 4a holds the arrangement comprising the plunger piston 4, the pressure plate 5, the elastomer spring element 9 and the first valve piston 10 together as a structural unit which can be pre-assembled, with a predefined prestress which is applied by the elastomer spring element 9.

The first valve piston 10 interacts in a known manner by way of its annular sealing seat 13 on its cylindrical projection 12 with a first annular plate valve 14. The first annular plate valve 14 has a radial sealing face 15 which for its part interacts in a known manner with a first non-displaceable sealing seat 16 in the housing upper part 2. The first annular plate valve 14 is guided with a cylindrical projection 14a radially inside a second valve piston 30, such that it can be displaced axially over a small travel, and is sealed with respect to the second valve piston 30 by means of a sealing ring 31.

The first annular plate valve 14 is surrounded by a first pressure space 17 which is fed compressed air from a compressed-air source in a manner which is known but not shown. The first annular plate valve 14 is pierced, as a result of which a venting passage is formed.

A back-pressure spring 20 is supported on the housing upper part 2 and on the first valve piston 10 and ensures that the arrangement of the plunger piston 4, the pressure plate 5, the elastomer spring element 9 and the first valve piston 10 bears axially against the upper securing ring 7 when the plunger piston 4 is not actuated.

A compression spring 21 which is arranged in the first pressure space 17 is supported axially at one end on the first annular plate valve 14 and at the other end on a lip seal 24 which is arranged in the housing upper part 2 and is secured against falling out by a securing ring 25.

A brake pressure space 22 for a first brake circuit (not shown) is formed between the first valve piston 10 and the first non-displaceable sealing seat 16, in which brake pressure space 22 a modulated brake pressure is built up by the interaction of the plunger piston 4 with the first valve piston 10 and the first annular plate valve 14.

A supporting element 23 is arranged axially displaceably on the first cylindrical projection 4a of the plunger piston 4 and bears against the head-shaped radial protrusion 11 of the first valve piston 10 under the pressure of a compression spring 26. The said compression spring 26 is supported with its other end on a supporting disc 27 which bears against a step between the first cylindrical projection 4a and a second cylindrical projection 4b of smaller diameter of the plunger piston 4. The supporting disc 27 is fixed on the said step by means of a securing ring 28. The supporting disc 27 comprises a number of perforations 27a or perforated holes to facilitate exhaust air flow during brake release.

The second valve piston 30 is guided axially in the housing lower part 3 such that it is sealed via two O-sealing rings 32, 33, and interacts by way of an annular sealing seat 34 with a second annular plate valve 37. A radial sealing face 38 of the second annular plate valve 37 interacts in a known way both with the annular sealing seat 34 on the second valve piston 30 and with a second, non-displaceable sealing seat 35 on a hollow-cylindrical projection 36 in the housing lower part 3. The hollow-cylindrical projection 36 in the housing lower part 3 is surrounded by an annular brake pressure space 39 which is connected to a second brake circuit (not shown), in order to feed a modulated brake pressure to the said second brake circuit.

A second pressure space 17a which is fed compressed air from a compressed-air source in a manner which is not shown is formed between a hollow-cylindrical projection 37a of the second annular plate valve 37 and the hollow-cylindrical projection 36 in the housing lower part 3. The said second pressure space 17a can be flow-connected in a manner which is not shown to the first pressure space 17 in the region of the first annular plate valve 14.

A compression spring 40 is arranged in the second pressure space 17a, which compression spring 40 is supported at one end on the second annular plate valve 37 and at the other end on a lip seal 41 which for its part is secured by a supporting ring 42. The supporting ring 42 is secured against falling out by a securing ring 43 and is connected via radially inwardly protruding radial spokes 42a to a hollow-cylindrical guide 42b which serves to guide the second cylindrical projection 4b of the plunger piston 4, with the result that the said plunger piston 4 is guided over a great length firstly via the pressure plate 5 in the housing upper part 2 and via the hollow-cylindrical guide 42b in the housing lower part 3.

The control valve 1 is ventilated in a known way by the venting passage and a venting cap 44 on the housing lower part 3 when the brake pressure in the brake pressure spaces 22 and 39 is reduced or neutralized completely by retraction of the plunger piston 4.

It can be seen that the arrangement of the plunger piston 4, the pressure plate 5, the elastomer spring element 9, the first valve piston 10, the first annular plate valve 14, the second valve piston 30 and the second annular plate valve 37 according to the control valve 1 which is shown in FIG. 2 is consistent with the corresponding arrangement of the plunger piston 48, the pressure plate 49, the elastomer spring element 52, the first valve piston 53, the first annular plate valve 54, the second valve piston 55 and the second annular plate valve 56 of the control valve 45 (shown in FIG. 1) according to the prior art. Accordingly, its method of operation is also the same, which corresponds to the printed prior art mentioned at the outset, but is not the subject matter of the present invention.

The control valve 1 which is configured according to the invention is of very compact overall design because the first valve piston 53 according to FIG. 1 and the first valve piston 10 according to FIG. 2 have approximately the same diameter. With regard to its seal by way of the sealing lip 9a which is arranged radially on the outside, however, the first valve piston 10 of the control valve 1 according to FIG. 2 is unsusceptible to tilting moments and transverse forces which are applied by the plunger piston 4. As a result of the single-piece configuration of elastomer spring element 9 and first valve piston 10, they can be mounted easily during the assembly of the control valve 1 and the production of the sealing lip 9a which is arranged radially on the outside on the first valve piston 10 can be carried out comparatively simply. In addition, the first, usually metallic valve piston 10 is very short axially, as a result of which the overall weight of the control valve 1 can be lower than in the case of known control valves of the same design.

When the Plunger piston 4 is actuated, the first valve piston 10 moves down due to combined force transfer of rubber spring stiffness. When First valve piston 10 moves down the Supporting element 23 forces the Second valve piston 30 to move down, as the Supporting element 23 is in contact with First valve piston 10. Before the First valve piston 10 will open the First annular plate valve 14, the Second valve piston 30 comes into contact with Second annular plate valve 37, that means, the reaction force of the Compression spring 26 acts against the Compression spring 40, what facilitates easy opening of the Second annular plate valve 37.

On further actuation of the Plunger piston 4, the first valve piston 10 moves down and opens First annular plate valve 14, resulting in a connection of the air supply to the delivery port. As the Supporting element 23 is already in contact with the First valve piston 10, delivery air from top circuit just moves down to the Second valve piston 30 and opens Second annular plate valve 37 without any additional pressure build up in top circuit.

This arrangement is conventionally termed as a Delta P reduction arrangement. It helps in delivering approximately the same delivery pressure in both top and bottom circuit without much time lag.

All the features which are mentioned in the above description of the figures, in the claims and in the introduction of the description can be used both individually and in any desired combination with one another. The invention is therefore not restricted to the described and claimed combinations of features, but rather all combinations of features are to be considered to be disclosed.

LIST OF REFERENCE NUMERALS

1 Control valve
2 Housing upper part
3 Housing lower part
4 Plunger piston
4a First cylindrical projection of the plunger piston 4
4a Second cylindrical projection of the plunger piston 4
5 Pressure plate
5a Hollow-cylindrical projection of the pressure plate 5
6 Groove in the housing upper part
7 Securing ring
8 Folding bellows
9 Elastomer spring element
9a Sealing lip
9b Annular protrusion
9c Smaller diameter region of the elastomer spring element
9d Larger diameter region of the elastomer spring element
10 First valve piston
10a Undercut groove in the first valve piston 10
11 Head-shaped radial protrusion on the first valve piston 10
12 Hollow-cylindrical projection on the first valve piston 10
13 Annular sealing seat on the projection 12 of the first valve piston 10
14 First annular plate valve
14a Cylindrical projection on the first annular plate valve 14
15 Radial sealing face on the first annular plate valve 14
16 First non-displaceable sealing seat in the housing upper part 2
17 First pressure space
17a Second pressure space
19 Securing ring
20 Back-pressure spring
21 Compression spring
22 Brake pressure space for a first brake circuit
23 Supporting element
24 Lip seal
25 Securing ring
26 Compression spring
27 Supporting disc
27a Perforation
28 Securing ring
29 Sealing ring
30 Second valve piston
31 Sealing ring
32 Sealing ring
33 Sealing ring
34 Annular sealing seat on the second valve piston 30
35 Second non-displaceable sealing seat in the housing lower part 3
36 Hollow-cylindrical projection in the housing lower part 3
37 Second annular plate valve
37a Hollow-cylindrical projection of the second annular plate valve 37
38 Radial sealing face on the second annular plate valve 37
39 Second brake pressure space for a second brake circuit
40 Compression spring
41 Lip seal
42 Supporting ring
42a Radial spokes
42b Hollow-cylindrical guide
43 Securing ring
44 Venting cap
45 Control valve according to the prior art
46 Housing upper part of the control valve 45
47 Housing lower part of the control valve 45
48 Plunger piston of the control valve 45
49 Pressure plate of the control valve 45
50 Groove of the control valve 45
51 Securing ring of the control valve 45
52 Elastomer spring element of the control valve 45
52c Smaller diameter region of the elastomer spring element 52
52d Larger diameter region of the elastomer spring element 52
53 First valve piston of the control valve 45
54 First annular plate valve of the control valve 45
55 Second valve piston of the control valve 45
56 Second annular plate valve of the control valve 45
57 Central hole in the cylindrical projection 12 of the control valve 1

We claim:

1. A pneumatic control valve in the form of a dual-circuit brake transducer in a compressed-air brake system of a vehicle for correcting a brake pressure which corresponds to a desired braking action, having at least one first valve system which is arranged in a housing upper part with a first valve piston which can be actuated via an elastomer spring element manually or by means of an actuator and with a first annular plate valve which interacts therewith, and having a second valve system which is arranged in a housing lower part with a coaxially arranged second valve piston which can be actuated pneumatically and/or mechanically by the first valve system and with a second annular plate valve which interacts therewith, wherein, in the case of the first valve system, the elastomer spring element and the first valve piston are configured in one piece as a composite component, and in that, in the region of a radial sealing lip of the elastomer spring element, the material of the elastomer spring element engages radially and axially in a positively locking manner around a radially outer section of the first valve piston.

2. The control valve according to claim 1, wherein, on its side which is remote from the second valve piston, the first valve piston has an undercut annular groove, into which a complementarily shaped, annular protrusion on the elastomer spring element engages in a positively locking manner.

3. The control valve according to claim 1, wherein that region of the elastomer spring element which brings about a resilient support of the first valve piston on a pressure plate has a greater Shore hardness than the sealing lip.

4. The control valve according to claim 1, wherein the elastomer spring element is of frustoconical configuration outside its connecting region to the first valve piston, and in that the elastomer spring element is supported in said frustoconical region with its smaller diameter region on the first valve piston and with its larger diameter region on the pressure plate.

5. The control valve according to claim 4, wherein the first valve piston has, radially on the inside, a hollow-cylindrical projection into which a section of the plunger piston protrudes in a positively locking manner, which section centres the first valve piston radially.

6. The control valve according to claim 1, wherein a hollow-cylindrical projection of the first valve piston has a central hole, through which a cylindrical projection of the plunger piston protrudes.

7. The control valve according to claim 1, wherein the plunger piston is received fixedly in a central, stepped bore of the pressure plate, in that the plunger piston is guided axially in the housing upper part by means of a radially outer cylindrical projection of the pressure plate, and in that the elastomer spring element is supported axially and radially with its larger diameter region which is remote from the piston radially inside the cylindrical projection of the pressure plate on the said pressure plate.

8. A commercial vehicle, having a control valve according to claim 1.

* * * * *